US005680444A

United States Patent [19]
Reeves

[11] Patent Number: 5,680,444
[45] Date of Patent: Oct. 21, 1997

[54] MESSAGE FORWARDING IN VOICE-MAIL SYSTEM

[75] Inventor: John Paul Reeves, Fishers, Ind.

[73] Assignee: Lucent Technologies Inc., Murray Hill, N.J.

[21] Appl. No.: 657,001

[22] Filed: May 28, 1996

Related U.S. Application Data

[63] Continuation of Ser. No. 344,317, Nov. 22, 1994, abandoned.

[51] Int. Cl.[6] .................................................. H04M 3/50
[52] U.S. Cl. ............................... 379/67; 379/39; 379/212
[58] Field of Search ............................. 379/67, 88, 89, 379/211, 212, 279, 93, 94, 95; 370/61

[56] References Cited

U.S. PATENT DOCUMENTS

| 4,625,081 | 11/1986 | Lotito et al. ............................. 379/88 |
| 4,652,700 | 3/1987 | Matthews et al. ...................... 379/89 |
| 4,747,126 | 5/1988 | Hood et al. ............................. 379/88 |
| 4,853,952 | 8/1989 | Jachmann et al. ..................... 379/88 |
| 5,153,905 | 10/1992 | Bergeron et al. ..................... 379/89 |
| 5,247,568 | 9/1993 | Bergsman et al. .................... 379/89 |
| 5,333,266 | 7/1994 | Boaz et al. ............................. 379/89 |
| 5,353,259 | 10/1994 | Howes et al. ........................ 379/89 |
| 5,481,597 | 1/1996 | Given .................................... 379/89 |
| 5,509,061 | 4/1996 | Amereller et al. .................... 379/89 |

*Primary Examiner*—Krista M. Zele
*Assistant Examiner*—Scott Wolinsky

[57] ABSTRACT

A voice system and method in which messages are stored as data files. One or more tags are associated with each file, which identify the mailboxes intended to receive the message contained in the file. An owner of a mailbox can transfer a message to another mailbox by changing the tag to designate a transferee-mailbox. This tag manipulation saves memory space because the message file is not copied into the transferee-mailbox, only a tag is changed. Time is also saved because no delay is imposed by a copying process.

3 Claims, 8 Drawing Sheets

MESSAGE FORWARDING IN VOICE-MAIL SYSTEM

This is a continuation of application Ser. No. 08/344,317, filed on Nov. 22, 1994, now abandoned.

The invention concerns assigning an incoming message to a new voice mail box, after the message has been stored into an initial mailbox. In addition, the invention allows a message to be assigned to multiple boxes, and further allows the multiple assignment to be changed at a later time.

BACKGROUND OF THE INVENTION

Some telephone answering systems can be programmed to answer a caller with a greeting such as the following:

"Thank you for calling our company. To leave a message for Adams, press 1;

for Baker, press 2;

for Caldwell, press 3 . . . " and so on.

When the caller presses a telephone key, the answering system stores the caller's message in the corresponding mailbox.

Some callers fail to make a selection of a mailbox, so the answering system assigns their messages to a default mailbox. These messages must later be transferred to the correct mailboxes, at which time the problem described below is encountered.

In other instances, the greeting can be quite lengthy. Some impatient callers wish to avoid listening to the entire greeting. These callers prefer to leave a message as soon as possible.

These callers typically (a) select the first mailbox suggested by the greeting, or (b) select a box at random. In either case, the callers' messages are delivered to incorrect mailboxes (unless their selection happens to be accidentally correct).

Later, when the owners of the mailboxes fetch their messages, some owners will discover these incorrectly delivered messages. When these owners attempt to transfer the messages to the correct mailboxes, they may encounter a problem. (The transferor from the default mailbox may encounter the same problem.)

The problem is that, in many answering systems, a "transfer" of a message does not involve an actual transfer, in the sense of re-locating a message (which is a block of data stored in memory) from one mailbox to another. Instead, in the "transfer," the system copies the message into the transferee-mailbox, and retains the original message in the original mailbox. Two copies of the message now exist. Each mailbox is assigned memory space. In the "transfer," MESSAGE 1 was copied into MAILBOX 4. Afterward, two copies of MESSAGE 1 exist.

Retaining two copies of the message is expensive, because it consumes memory space which could otherwise be used for other messages.

SUMMARY OF THE INVENTION

In one form of the invention, a voice mail system associates one or more tags with each message. The tags identify the destinations for the message. Only one copy of the message is stored. When an owner of a mailbox wishes to fetch messages, the system locates all tags associated with the mailbox, and finds and plays the corresponding messages.

DETAILED DESCRIPTION OF THE INVENTION

First Example

Figure 1:
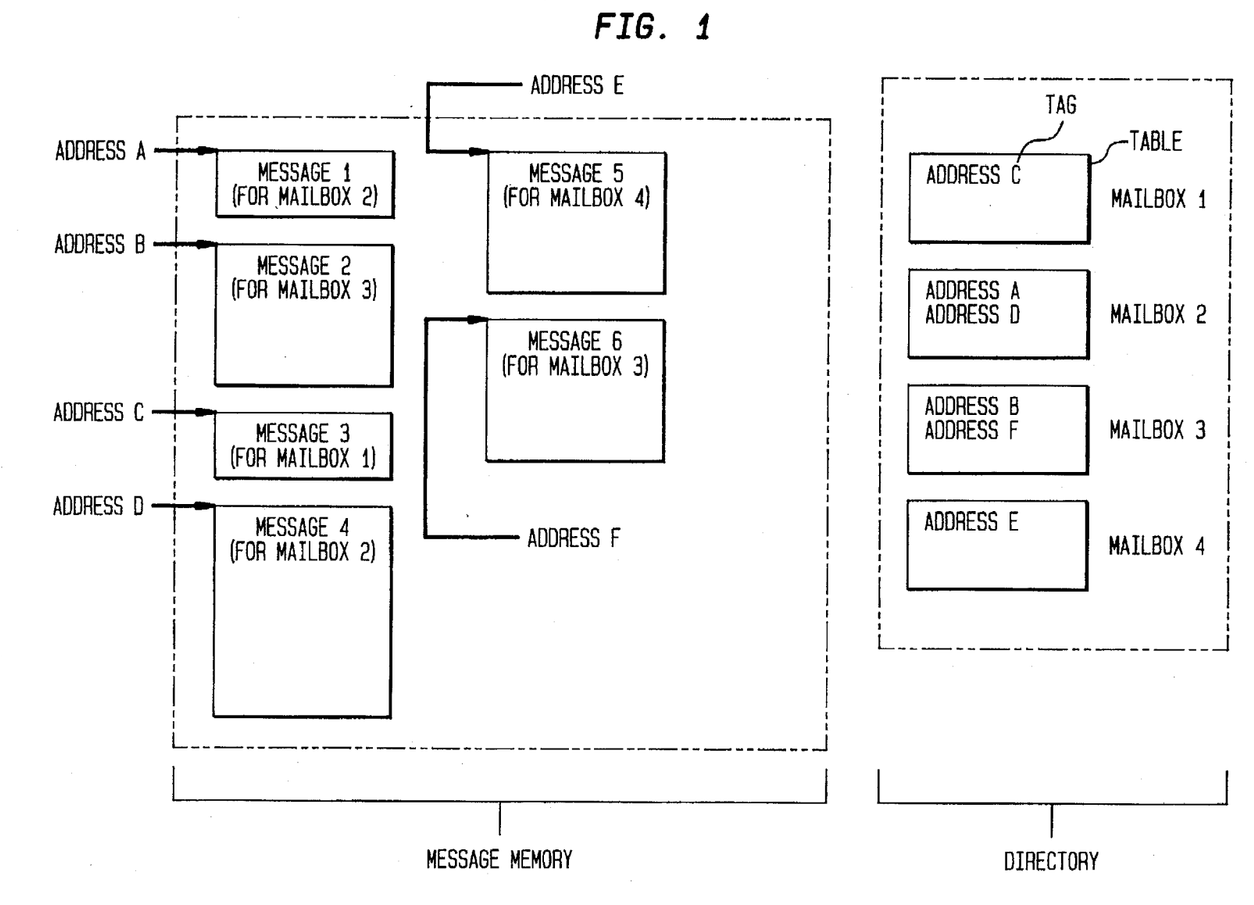
FIG. 1 illustrates one form of the invention.

Two simplified examples will illustrate different forms of the invention. FIG. 1 shows one example, wherein voice mail messages are stored in MESSAGE MEMORY, which is digital, random-access memory, or an equivalent. Each message is assigned a block of memory, and can be called a message-block. The messages are assigned space in MESSAGE MEMORY in the order they arrive.

For example, the block labeled MESSAGE 1 is a message-block, and is the first to arrive. It is assigned to the block of memory beginning at ADDRESS A, as indicated. (This starting address of a message block will be termed the "address" of the message block, even though the message block, in fact, spans numerous memory addresses.)

MESSAGE 2, which is the next to arrive, is stored at ADDRESS B, adjacent to MESSAGE 1, and so on. Such storage, and apparatus to accomplish it, are known in the art.

A DIRECTORY resides in another region of memory. The DIRECTORY holds the addresses of the message blocks for each mailbox. These addresses are called tags. The tags are shown grouped within boxes in the DIRECTORY. Each group forms a table of addresses for a respective mailbox.

For example, ADDRESS C is associated with MAILBOX 1, indicating that one message is being held for MAILBOX 1, and that this message is stored in MESSAGE MEMORY at the location beginning with ADDRESS C. The table for MAILBOX 1 contains one entry.

As another example, two entries, namely, ADDRESS A and ADDRESS D, are associated with MAILBOX 2, indicating that two messages are being held for MAILBOX 2, namely, those message blocks beginning at ADDRESS A and ADDRESS D. The table for MAILBOX 2 contains two entries.

When an owner of a mailbox wishes to fetch messages, the voice mail system examines the DIRECTORY for the addresses associated with the owner's mailbox. Then the system fetches and plays the message-blocks located at these addresses.

For example, when the owner of MAILBOX 3 fetches messages, the system plays both MESSAGE 2 (located at ADDRESS B) and MESSAGE 6 (located at ADDRESS F).

Copying and Re-locating Messages

Figure 2:
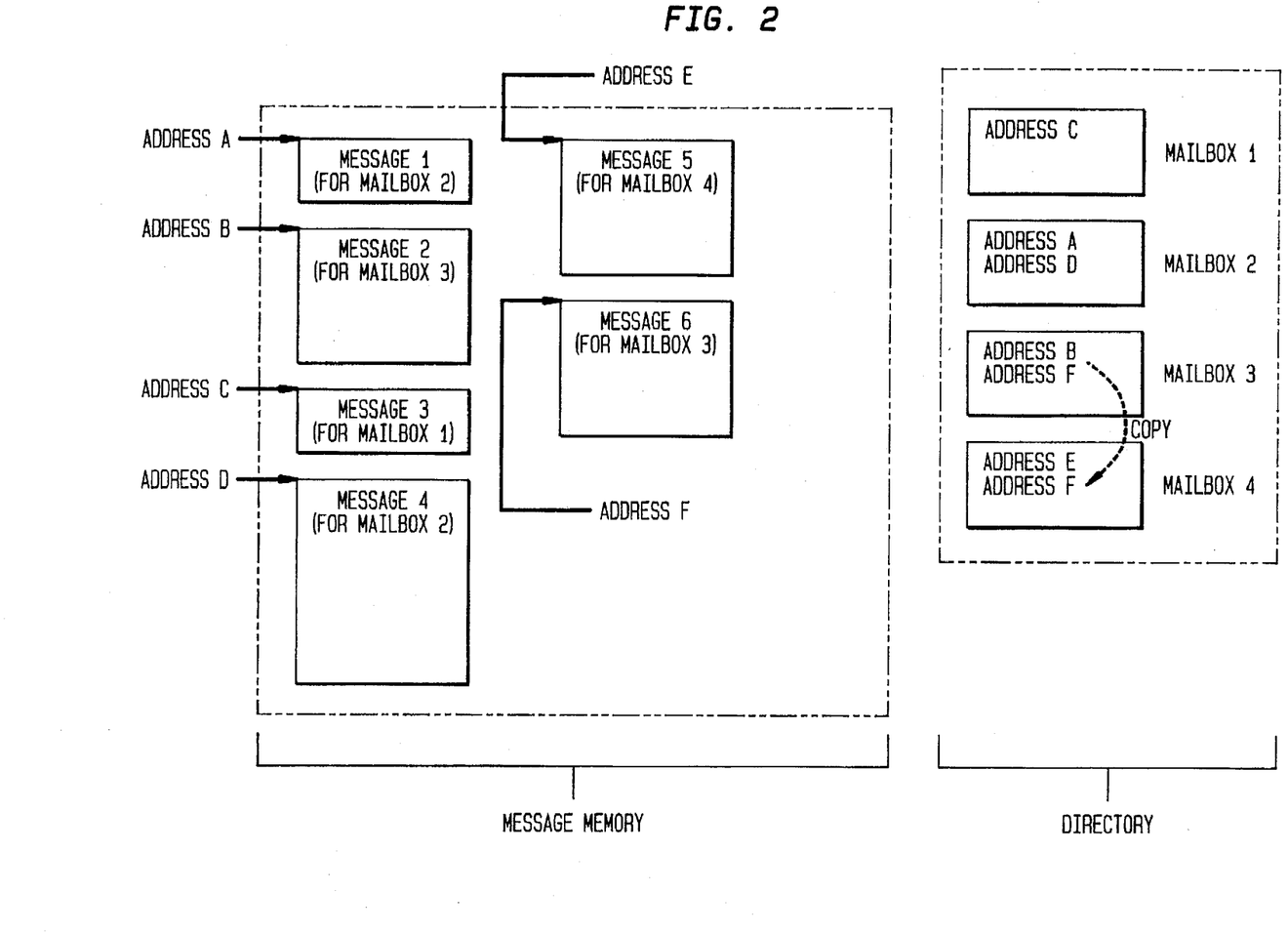
FIG. 2 illustrates copying of a message, using the structure shown in FIG. 1.

The owner of a mailbox can copy a message to another mailbox, by adding the address of the message-block to the table of the other mailbox. FIG. 2 provides an example, indicated by the symbol COPY located in the DIRECTORY. The owner of MAILBOX 3 adds MESSAGE 6 (at ADDRESS F) to MAILBOX 4, by placing ADDRESS F into the table of MAILBOX 4.

Similarly, the owner of a mailbox can transfer a message to another mailbox. The procedure is similar to the copying described above, with the exception that the owner deletes the address of the transferred message from the owner's table. That is, the owner transfers the tag to the recipient, and retains no copy.

The procedure followed is to (a) add the address of the message-block in question to the table of a transferee-mailbox, and (b) delete the address from the table of the owner's mailbox. In the example of FIG. 2, the owner of MAILBOX 3 would delete "ADDRESS F" from the table for the owner's mailbox, namely, MAILBOX 3.

Figure 3:
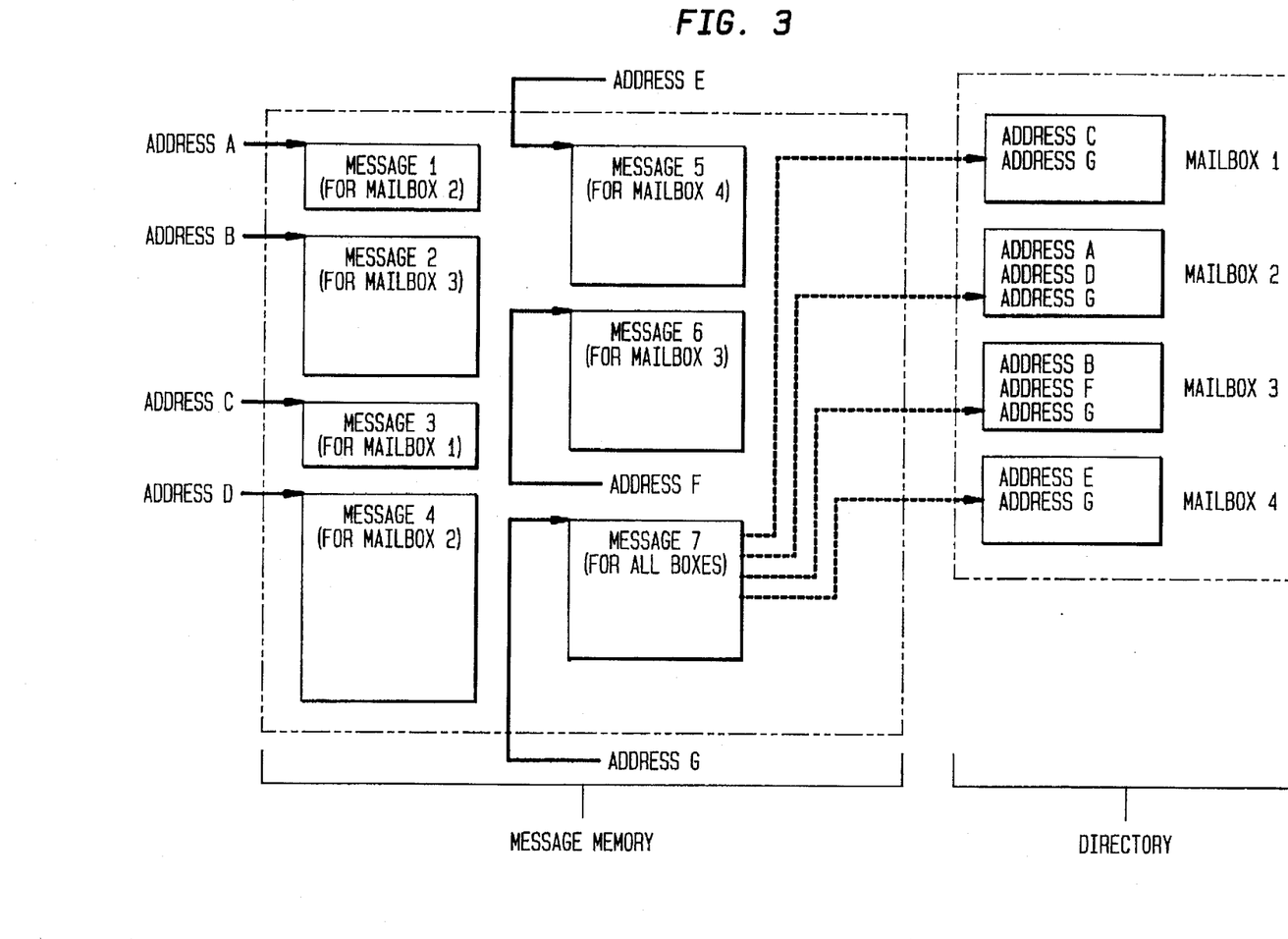
FIG. 3 illustrates multiple copying, using the structure of FIG. 1.

In addition, a single message can be copied to multiple mailboxes, as illustrated in FIG. 3. MESSAGE 7 (at ADDRESS G) is added to all boxes, by adding "ADDRESS G" to the table of each mailbox, as indicated.

Therefore, the memory structure of FIG. 1 allows any owner of a mailbox to copy, or transfer, to another mailbox, a message contained in the owner's mailbox. In addition, the owner can distribute a message to multiple mailboxes, by manipulating the table entries for the mailboxes. But only a single copy of the message exists.

Second Approach

Figure 4:
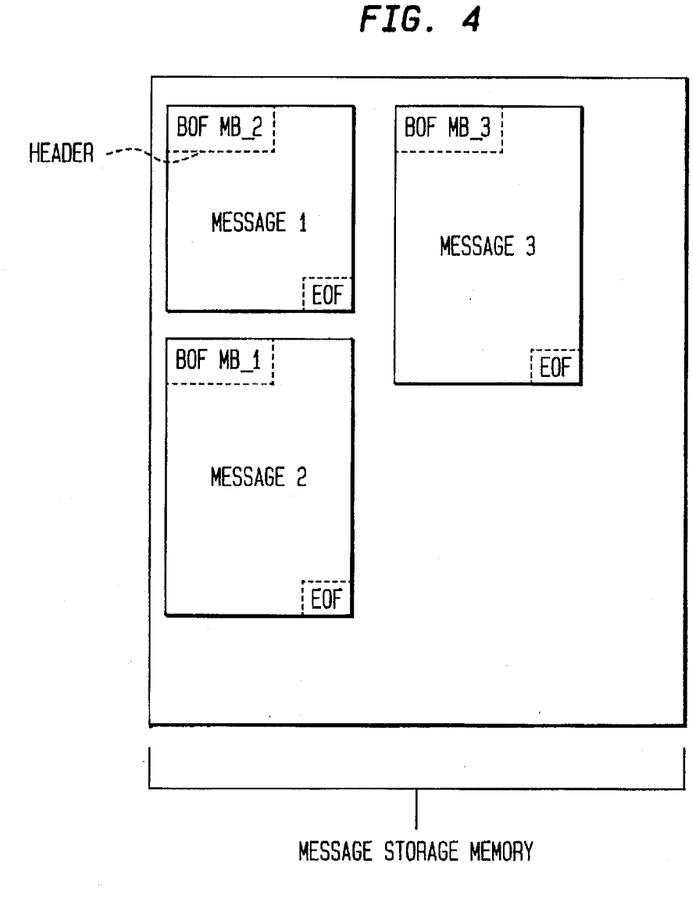
FIG. 4 illustrates another form of the invention.

FIG. 4 illustrates another approach. Each message-block contains a HEADER, as indicated, which contains data used by the system for handling the message-blocks. For example, each HEADER can contain information such as the following:

Beginning-of-File (BOF) marker,
Date and Time of creation,
Identification of caller,
File size,
Identification of intended recipient-mailbox, and so on.

The last-listed element ("identification of . . . ") serves the function of the tag discussed in the First Approach; it identifies the mailbox intended to receive the message.

For simplicity, FIG. 4 shows only two of the pieces of information contained in the header, namely, the BOF and the tag. The tag for MESSAGE 1 is indicated as MB__2, meaning that MESSAGE 1 is intended for mailbox 2. For MESSAGE 2, the tag is MB__1, indicating that MESSAGE 2 is intended for mailbox 1.

Figure 5:
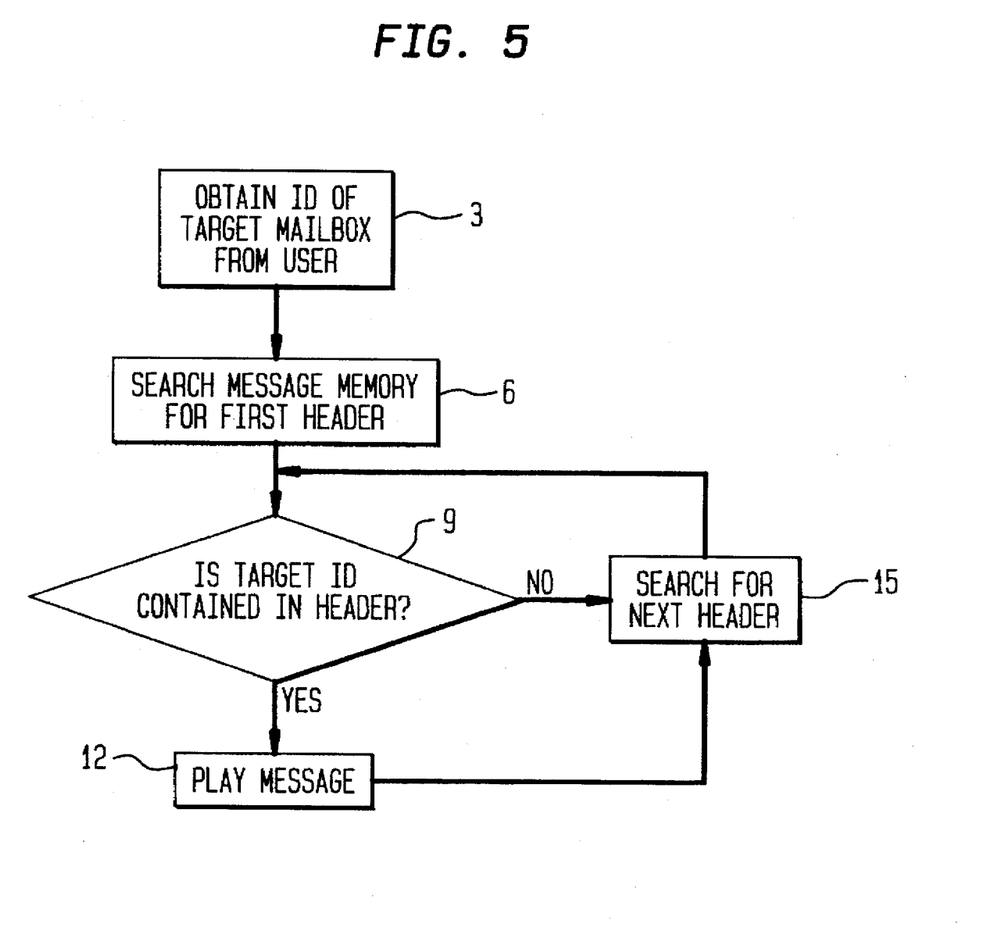
FIG. 5 illustrates one approach to fetching messages, under the form of the invention shown in FIG. 4.

When the owner of a mailbox seeks to fetch messages, the system executes the logic indicated in FIG. 5. Assume that the owner owns MAILBOX 1. First, the system obtains the identity of a TARGET MAILBOX (eg, MB__1), as indicated in block 3. (The TARGET MAILBOX is the mailbox whose contents are to be fetched.)

Then, the system searches MESSAGE MEMORY for the first HEADER, as indicated in block 6. When the first HEADER is found, the system inquires whether the TARGET MAILBOX is identified in the header, as indicated by block 9. If so, then the message-block is played, as indicated by block 12. If not, the system searches for the next header, as indicated by block 15, and repeats the tag examination, by repeating the logic of block 9. The process repeats until the supply of HEADERs is exhausted.

Copying and Re-locating Messages

To copy a message, an owner orders the system to add a tag, indicating the additional mailbox which now owns the message, to the existing tag within the HEADER. That is, the HEADER now contains two tags. (In principle, there is no limit to the number of tags which can exist within a HEADER.)

To transfer a message to another mailbox, an owner orders the system to add a tag to the HEADER which identifies the transferee-mailbox, and orders the system to delete the owner's tag.

Figure 6:
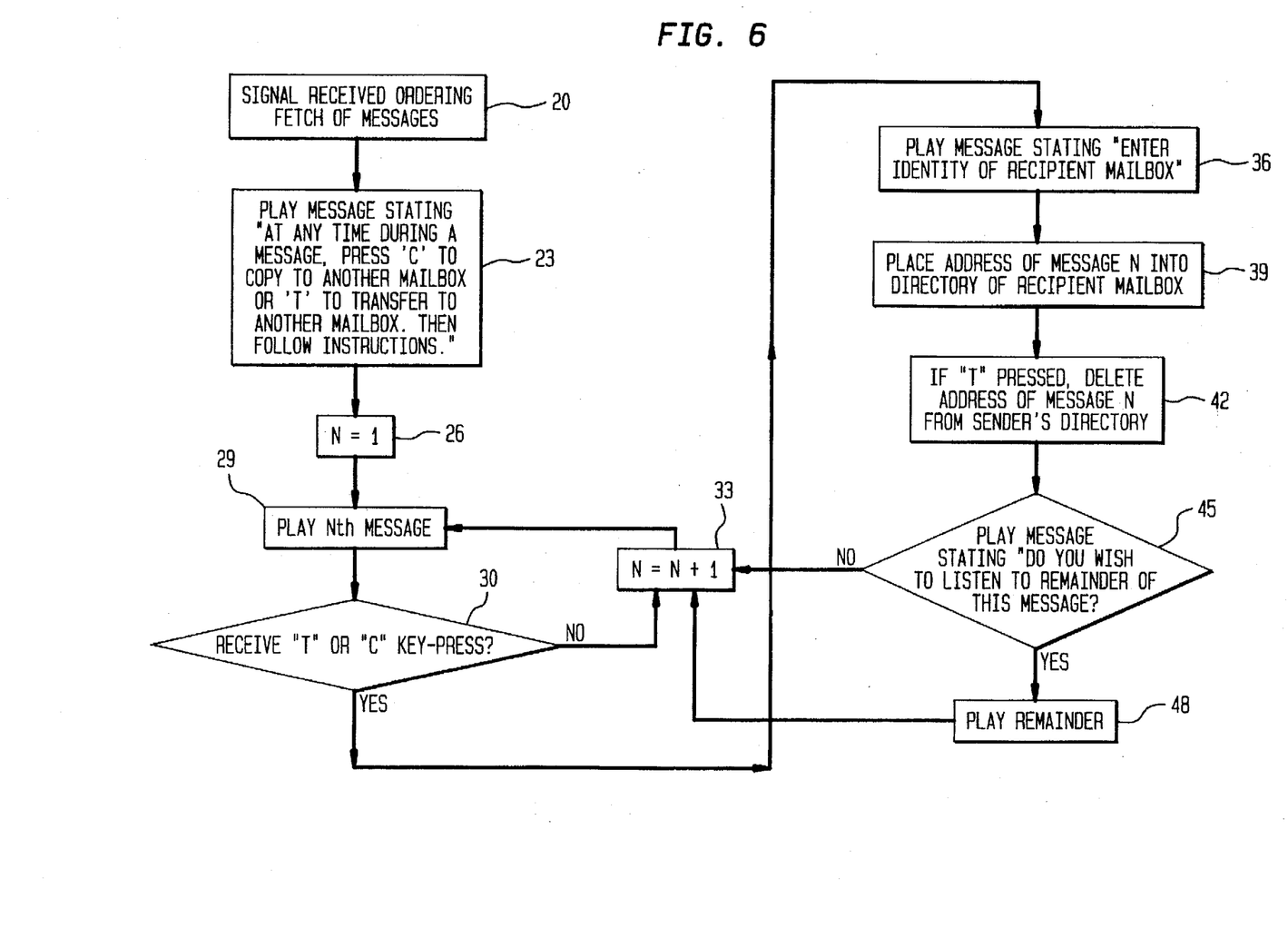
FIG. 6 is a flow chart illustrating exemplary logic for transferring messages.

Logic Flow for Transfer There are numerous approaches to implementing particular logic which will embody the invention. One approach is shown in FIG. 6.

Block 20 is reached when an owner of a mailbox gains access to the mailbox, and orders retrieval of messages. The system first plays an instructional message to the owner, as indicated in block 23, telling the owner to press "T" or "C" while a voice mail message is being played, in order to transfer or copy that message.

An index for a counter is set in block 26. Block 29 plays the Nth message. N, at this time, is one. Block 30 indicates that the system listens for key-presses by the owner while the message is being played.

Figure 7:
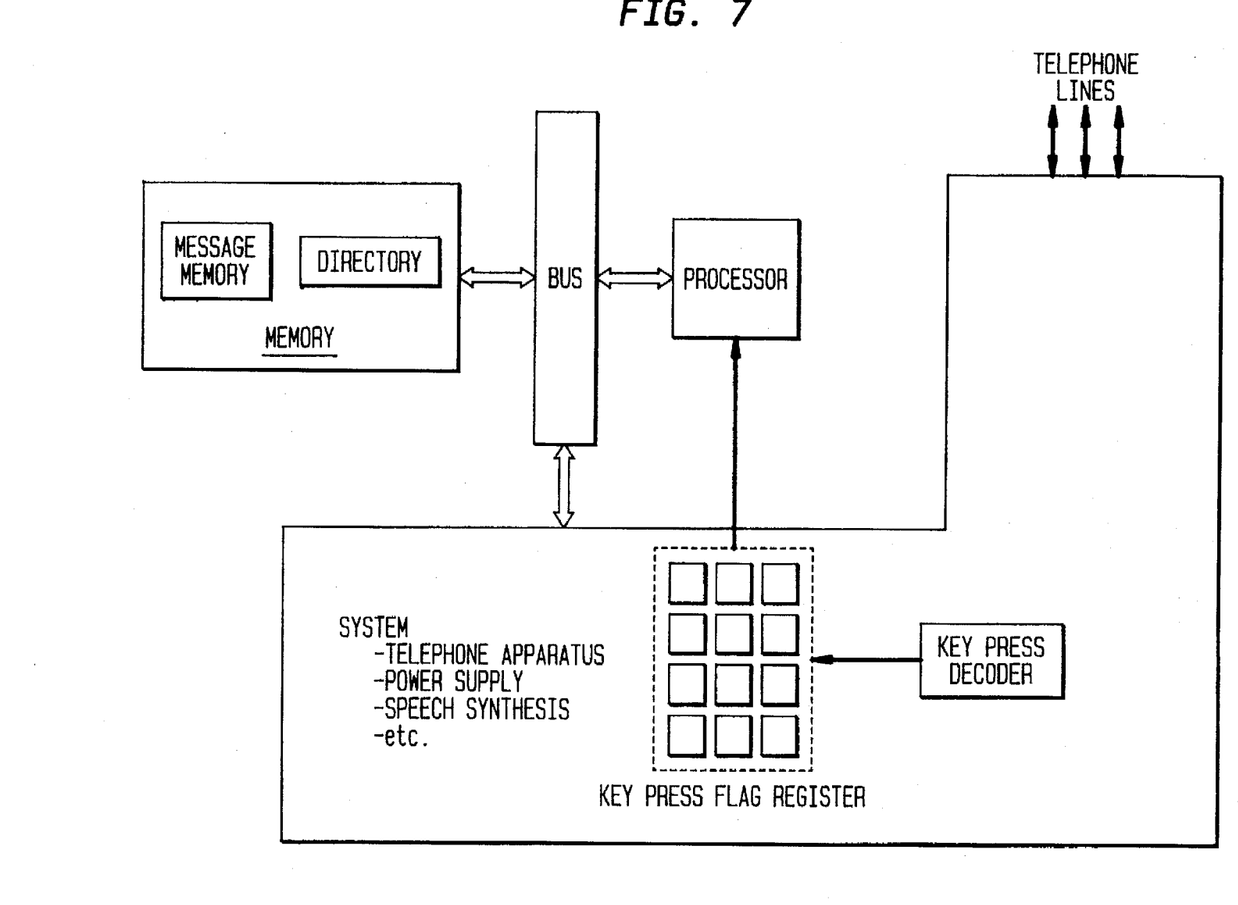
FIG. 7 illustrates an exemplary architecture for a system embodying the invention.

Key-presses can be detected by a KEY PRESS DECODER, shown in FIG. 7. When a key press is detected, the KEY PRESS DECODER identifies the key by setting a flag in a KEY PRESS FLAG REGISTER. The PROCESSOR (which executes the logic of FIG. 6) periodically examines this REGISTER.

If no key press is detected, the PROCESSOR takes the NO branch from decision block 30 in FIG. 6. The index is incremented, in block 33, and the next message is played.

If a key press of "T" or "C" is detected, the PROCESSOR takes the YES branch. The system plays another instruction, as indicated in block 36. In response, the owner presses the keys identifying the recipient mailbox. The PROCESSOR obtains the key information from the KEY PRESS FLAG REGISTER in FIG. 7.

The PROCESSOR then places the tag for the Nth message into the table of the mailbox identified by the key presses, as indicated by block 39. (TAGs and TABLEs are shown in FIG. 1.) If a transfer, rather than a copy, was requested, the PROCESSOR deletes the tag of the Nth message from the owner's table.

Then, since playing of the Nth message was interrupted, the system plays a message asking whether the owner wishes to hear the remainder of the interrupted message, as indicated by block 45. If so, the remainder is played, and the next message is played. If not, the next message is played.

Alternate Logic

Figure 8:
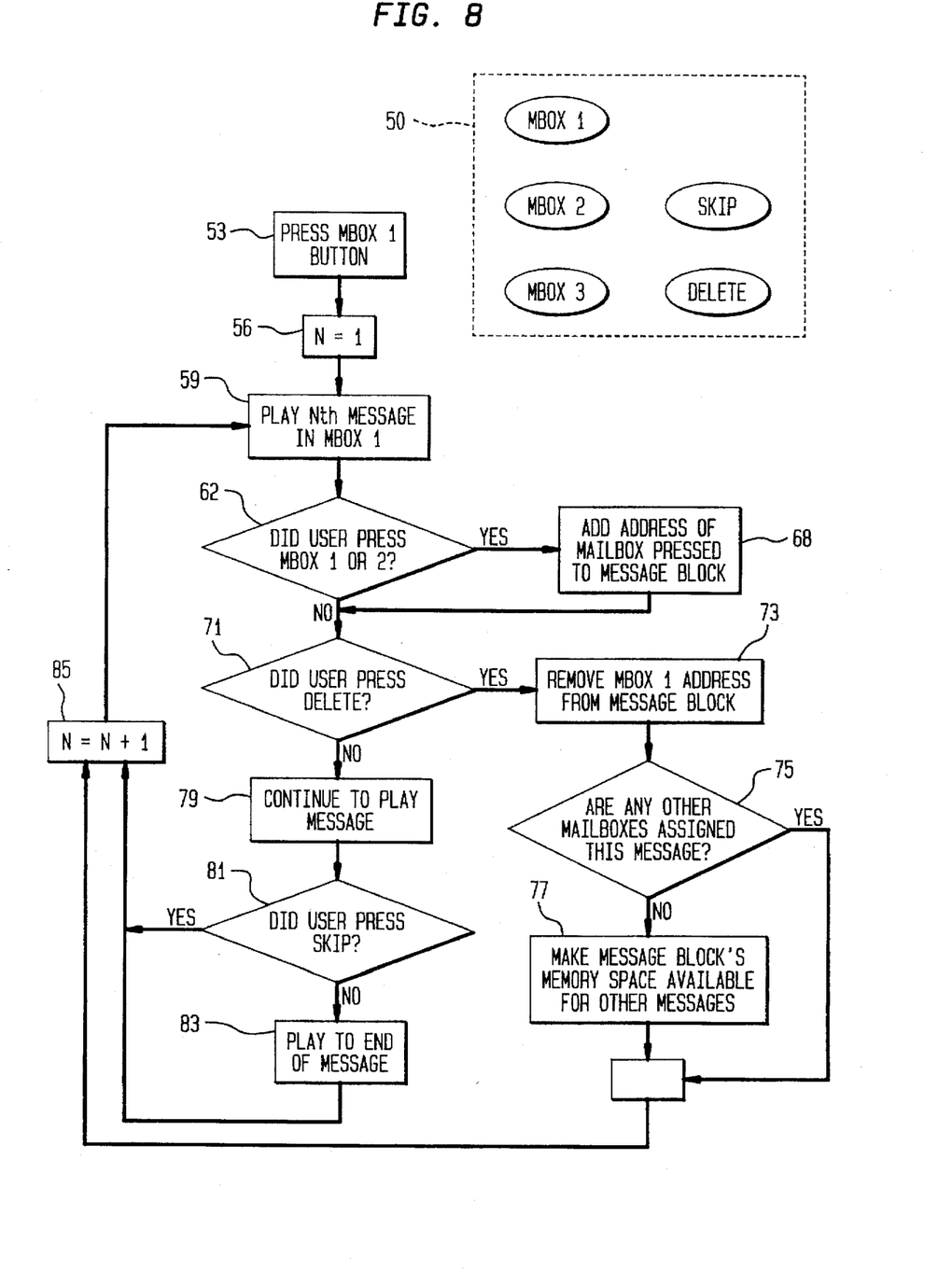
FIG. 8 illustrates another flowchart which can implement one form of the invention.

The logic of FIG. 6 is highly generic. FIG. 8 illustrates logic which is compatible with a common, pre-existing, interface used in voice mail machines.

In FIG. 8, the dashed block 50 indicates the keys available on the housing of the machine, by which a user selects options. The key MBOX 1 allows a user to order the machine to play the messages stored in mailbox 1. Keys MBOX 2 and MBOX 3 are similar, but apply to mailboxes 2 and 3.

The SKIP button allows a user to jump over a message which is currently being played. The DELETE button allows a user to delete the message which is currently being played.

In FIG. 8, assume that a user pressed MBOX 1, as indicated in block 53. The system plays the Nth message contained in MAILBOX 1, as indicated by block 59. While this message is being played, the system looks for key presses.

If the user presses MBOX 2 or MBOX 3, indicating that the user wishes to transfer the message to the indicated mailbox, then the YES branch from block 62 is taken. Assume that the user pressed MBOX 2. The system then adds the address of mailbox 2 to the MESSAGE BLOCK.

For example, the system can add "MBOX 2" to the HEADER shown in FIG. 4. In addition, the system may delete the address of MBOX 1 from the MESSAGE BLOCK, depending on the design.

If the user presses DELETE, the YES branch is taken from block 71. The system deletes MBOX 1 from the MESSAGE BLOCK. For example, the system can delete MBOX 1 from the HEADER shown in FIG. 4.

The DELETE operation can result in a situation wherein no mailboxes are assigned the message after the deletion occurs. Block 75 inquires after this possibility. If the message is unassigned, then the message is, in effect, erased, as indicated in block 77. (Of course, immediate erasure is not required. Block 77 indicates that the memory space previously occupied by the Nth message is simply now made available for other messages, if they arrive.)

If neither of these two options (MBOX OTHER and DELETE) were selected, the logic proceeds to block 81, which continues to play the message. If the user presses SKIP, the YES branch of block 81 is taken, which causes the next message to be played.

When the logic branches reach block 85, the counter N is incremented, and the next message is played, as indicated by block 59.

Exemplary Architecture

There are numerous possible architectures for implementing the invention. FIG. 7 illustrates an exemplary architecture.

The SYSTEM represents many of the components of a standard voice mail system. A PROCESSOR executes the logic indicated in FIG. 6, and obtains key press information from the KEY PRESS FLAG REGISTER.

Important Considerations

1. The invention stores multiple digitized audio messages. A list of recipients is designated for each message; the list is a collection of tags, each identifying a recipient-mailbox. The list can contain a single tag, or multiple tags.

The original owner of a message (that is, the owner of the mailbox which received the message when it arrived) can modify the list, and thereby determine which mailboxes will receive the message. But only a single copy of the message is stored, thereby saving memory.

2. In large voice mail systems, system administrators may oversee the operation of the system. The administrator may be given authority to freely modify all tags for all messages.

3. It is not necessary that each message be stored as a continuous block. Fragmentation is allowable. Nevertheless, it is preferred that only a single copy of each message is stored. No duplication of the type shown in FIG. 1A should be undertaken.

In that Figure, the copy of MESSAGE 1 contained in MAILBOX 4 is redundant, from the perspective of the overall system: MESSAGE 1 also exists in MAILBOX 1. (From the perspective of the owner of MAILBOX 4, MESSAGE 1 may not be redundant, because the owner does not see the redundancy, because the owner has no access to MAILBOX 1.)

Under the invention, the messages are stored non-redundantly.

4. It is not strictly necessary that the MESSAGE MEMORY be of the solid-state type. Any memory which allows sufficiently fast retrieval can be used.

5. The inventor points out that the system may be designed to allow only an owner of a message to obtain access to the message. For example, in FIG. 1, each owner of a mailbox can only obtain access to the messages contained in the owner's table.

However, the invention allows ownership to change. In FIG. 3, ownership of MESSAGE 6 was changed from MAILBOX 3 only, to both MAILBOX 3 and MAILBOX 4. When MAILBOX 4 obtains ownership, its owner can further change ownership of MESSAGE 6. For example, the owner can add "ADDRESS F" to the table for MAILBOX 1, thereby giving access to MESSAGE 6 to MAILBOX 1.

6. In some systems, it may be desired to allow any owner of a mailbox to obtain access to any other mailbox. In such a system, any owner can add any desired tag to the owner's table.

However, in other systems, tighter security may be desired. An owner can add a tag to another owner's table, but cannot add tags to the owner's own table. (Otherwise, the owner can obtain access to all messages system-wide.)

Logic is implemented which enforces this security. For example, whenever an owner seeks to add a tag to another mailbox (either the owner's mailbox, or another's), inquiry is made as to whether the tag already exists in the owner's table. If so, the addition is allowed; if not, addition is prohibited.

7. In one form of the invention, the message block which is copied or transferred is not physically disturbed. It remains at its original location in memory. Thus, no time is required to perform a copying operation, of the type shown in FIG. 1A. (Both transfer and copying of the message require a copying operation, under the prior-art approach.)

This saving in time can be significant, because, to digitize a voice message, the message is sampled at a rate of a few thousand times per second. This sampling produces a large amount of data, which is stored as the message block.

For example, it is not unusual for a voice mail message block to consist of a file containing one or two million bytes, even after being compressed. Under the prior-art approach, if a mailbox owner orders this message block to be copied, the owner may be required to wait a few seconds, or longer, while the copying is performed.

The invention, on the other hand, does not copy the message block. It handles tags. The tags are very small blocks of data, which can be copied in a few clock cycles of a processor. It is reasonable to estimate that copying of a tag would never take longer than a millisecond. Such a short time is imperceptible to humans, and may be termed "immediate."

Thus, the invention allows the message blocks to be transferred immediately. Restated, the transfer operation of blocks 30, 36, 39, 42, and 45 in FIG. 6 can be accomplished as fast as the mailbox owner can enter key presses. There is no delay imposed by the system's copying of actual message blocks.

Numerous substitutions and modifications can be undertaken without departing from the true spirit and scope of the invention. What is desired to be secured by Letters Patent is the invention as defined by the following claims.

I claim:

1. In a voice-mail system, the improvement comprising:
   a) MESSAGE MEMORY comprising digital random-access memory for storing voice mail messages; and
   b) a DIRECTORY, containing tables, each of which
      i) is associated with a respective mailbox, and
      ii) can store one or more tags, which identify messages intended for said mailbox.

2. In a method of storing incoming voice mail messages in a voice mail system, the improvement comprising:
   a) storing an incoming message in digital random-access memory;
   b) associating one or more tags with the stored message, which identify recipients allowed to access the message; and
   c) allowing users to change tags associated with messages which identify said users as recipients, but not to change tags associated with other messages.

3. In a digital voice mail system, wherein voice mail messages are received from a telephone channel, and which includes mailboxes having owners, the improvement comprising:
   a) means for storing a single copy of each voice mail message in digitized format, without additional copies;
   b) a table which
      i) lists voice mail messages which are stored, and
      ii) associates one or more tags with each voice mail message listed, each tag comprising information in digital format which identifies a respective mailbox;
   c) means for limiting access to each voice mail message to mailboxes identified by the tags associated with said voice mail message; and
   d) means effective to enable each owner of a mailbox to
      i) add tags to messages already having tags which identify the mailbox of said owner; and
      ii) delete tags, which identify the mailbox of said owner, from messages.

* * * * *